US009698917B2

(12) United States Patent
Wu et al.

(10) Patent No.: US 9,698,917 B2
(45) Date of Patent: Jul. 4, 2017

(54) METHODS AND APPARATUS FOR MITIGATION OF RADIO-FREQUENCY IMPAIRMENTS IN WIRELESS NETWORK COMMUNICATION

(71) Applicant: Nokia Technologies Oy, Espoo (FI)

(72) Inventors: Piezhi Wu, San Diego, CA (US); Durgaprasad Shamain, San Jose, CA (US)

(73) Assignee: Nokia Technologies Oy, Espoo (FI)

(*) Notice: Subject to any disclaimer, the term of this patent is extended or adjusted under 35 U.S.C. 154(b) by 85 days.

(21) Appl. No.: 14/674,807

(22) Filed: Mar. 31, 2015

(65) Prior Publication Data

US 2016/0294491 A1    Oct. 6, 2016

(51) Int. Cl.
| H04L 12/26 | (2006.01) |
| H04B 17/309 | (2015.01) |
| H04W 24/08 | (2009.01) |
| H04L 27/38 | (2006.01) |
| H04W 84/12 | (2009.01) |
| H04L 27/26 | (2006.01) |

(52) U.S. Cl.
CPC ....... *H04B 17/309* (2015.01); *H04L 27/3863* (2013.01); *H04W 24/08* (2013.01); *H04L 27/2647* (2013.01); *H04W 84/12* (2013.01)

(58) Field of Classification Search
CPC .................................. H04B 17/309
USPC ....................................... 370/252
See application file for complete search history.

(56) References Cited

U.S. PATENT DOCUMENTS

| 7,251,291 B1 | 7/2007 | Dubuc et al. ............ 375/296 |
| 7,649,832 B2 * | 1/2010 | Egashira ............ H04L 27/2647 |
| | | 370/206 |
| 2005/0276354 A1 * | 12/2005 | Su .................. H04L 27/3863 |
| | | 375/326 |

(Continued)

FOREIGN PATENT DOCUMENTS

| BE | EP 1793548 A1 * | 6/2007 | ...... H04L 27/2657 |
| GB | 2484336 A | 4/2012 | |
| WO | WO-2013/156044 A1 | 10/2013 | |

OTHER PUBLICATIONS

Anttila, Lauri, et al., "Circularity-Based I/Q Imbalance Compensation in Wideband Direct-Conversion Receivers", IEEE Transactions on Vehicular Technology, Vo. 57, No. 4, Jul. 2008, pp. 2099-2113.

(Continued)

*Primary Examiner* — Melvin Marcelo
*Assistant Examiner* — Peter G Solinsky
(74) *Attorney, Agent, or Firm* — Harrington & Smith

(57) ABSTRACT

Systems and techniques for in-phase/quadrature estimation are described. As data frames are received at a wireless networking direct-conversion receiver, preambles of the data frames are examined to identify frequency-independent subcarriers. Preamble-based estimation is used to estimate in-phase/quadrature imbalance for frequency-independent subcarriers and blind estimation is used to estimate in-phase/quadrature imbalance for frequency-dependent subcarriers. The estimation may be performed continuously and refined as new frames are received. At appropriate intervals, compensation is performed using current imbalance estimates.

18 Claims, 3 Drawing Sheets

(56) References Cited

U.S. PATENT DOCUMENTS

| | | | |
|---|---|---|---|
| 2006/0209892 A1* | 9/2006 | MacMullan | H04N 5/775 370/468 |
| 2007/0047672 A1 | 3/2007 | Kim | 375/329 |
| 2008/0279221 A1* | 11/2008 | Wen | H04L 27/2647 370/500 |
| 2009/0163143 A1* | 6/2009 | De Rore | H04L 25/0212 455/63.1 |
| 2009/0232108 A1* | 9/2009 | Haghighat | H04J 11/0069 370/336 |
| 2010/0272208 A1* | 10/2010 | Feigin | H04L 27/3863 375/268 |
| 2011/0013724 A1 | 1/2011 | Metreaud et al. | 375/296 |
| 2011/0222638 A1* | 9/2011 | Park | H04L 27/3863 375/346 |
| 2012/0070159 A1* | 3/2012 | Ishihara | H04B 10/07951 398/202 |
| 2012/0106686 A1 | 5/2012 | Zhang et al. | 375/349 |
| 2014/0273907 A1 | 9/2014 | Narasimhan et al. | 455/307 |
| 2014/0355722 A1 | 12/2014 | Hsu et al. | 375/340 |
| 2015/0016571 A1* | 1/2015 | McCoy | H04L 1/0038 375/319 |
| 2016/0028426 A1* | 1/2016 | Plevel | H04B 1/123 455/63.1 |

OTHER PUBLICATIONS

Nam, Wooseok, et al., "Blind Adaptive I/Q Imbalance Compensation Algorithms for Direct-Conversion Receivers", IEEE Signal Processing Letters, vol. 19, No. 8, Aug. 2012, pp. 475-478.

Wu, Peizhi, et al., "I/Q Imbalance Estimation for Direct Conversion Receivers by Jointly Using the Existing Preambles and Blind Estimation", IEEE, 2015, 6 pgs.

Tsai, et al., "Blind Frequency-Dependent I/Q Imbalance Compensation for Direct-Conversion Receivers", IEEE Transactions on Wireless Communications, vol. 9, No. 6, (Jun. 2010), (11 pages).

Xing, G. et al.; "Frequency Offset and I/Q Imbalance Compensation for OFDM Direct-Conversion Receivers"; ICASSP 2003; IEEE; whole document (4 pages).

Windisch, M. et al.; "Preamble Design for an Efficient I/Q Imbalance Compensation in OFDM Direct-Conversion Receivers"; 2005; Proceedings of the $10^{th}$ International OFDM Workshop; whole document (5 pages).

Tsai, Y. et al.; "Blind Frequency-Dependent I/Q Imbalance Compensation for Direct-Conversion Receivers"; Jun. 2010; IEEE Transactions on Wireless Communications, vol. 9, Issue 6; pp. 1976-1986; (abstract only).

* cited by examiner

METHODS AND APPARATUS FOR MITIGATION OF RADIO-FREQUENCY IMPAIRMENTS IN WIRELESS NETWORK COMMUNICATION

FIELD OF THE INVENTION

The present invention relates generally wireless communication. More particularly, the invention relates to improved systems and techniques for improved mitigation or elimination of radio-frequency impairments in wireless network communication.

BACKGROUND

Wireless local area networking (often referred to as WLAN or Wifi) applications based on the IEEE 802.11 standard have become increasingly widespread, and serve as an important communications portal. Wireless local area networks may serve home and business users of networks established for a specific group of users and other wireless local area networks users of publicly accessible networks that may be open to all users or through paid or no-cost subscriptions. The number of Wifi users continues to increase and the data needs of such users also continues to increase. Increases in the efficiency and capacity of Wifi networks and devices benefit large numbers of operators and users.

SUMMARY OF THE INVENTION

In one embodiment of the invention, an apparatus comprises at least one processor and memory storing a program of instructions. The memory storing the program of instructions is configured to, with the at least one processor, cause the apparatus to at least receive one or more data frames transmitted to a direct conversion receiver operating in a wireless access network, examine a preamble of each data frame to identify one or more linearly independent subcarriers used for transmitting the data frame, and identify one or more linearly independent subcarriers transmitting each of the one or more data frames. The memory is further configured to, with the at least one processor, cause the apparatus to perform preamble-based estimation to estimate in-phase/quadrature imbalance using frequency domain symbols appearing in the preamble, perform blind estimation to estimate the phase/quadrature imbalance of one or more linearly dependent and independent subcarriers, generate an overall in-phase/quadrature imbalance estimate based on the preamble-based estimate and the blind estimation, and perform compensation based on the overall in-phase quadrature imbalance estimate.

In another embodiment of the invention, a method comprises receiving one or more data frames transmitted to a direct conversion receiver operating in a wireless access network, examining a preamble of each data frame to identify one or more linearly independent subcarriers used for transmitting the data frame, and identifying one or more linearly independent subcarriers transmitting each of the one or more data frames. The method further comprises performing preamble-based estimation to estimate in-phase/quadrature imbalance using frequency domain symbols appearing in the preamble, performing blind estimation to estimate the phase/quadrature imbalance of one or more linearly independent and independent subcarriers, generating an overall in-phase/quadrature imbalance estimate based on the preamble-based estimate and the blind estimation, and performing compensation based on the overall in-phase quadrature imbalance estimate.

In another embodiment of the invention, a computer-readable medium stores a program of instructions. Execution of the program of instructions by at least one processor configures an apparatus to at least receive one or more data frames transmitted to a direct conversion receiver operating in a wireless access network, examine a preamble of each data frame to identify one or more linearly independent subcarriers used for transmitting the data frame, and identify one or more linearly independent subcarriers transmitting each of the one or more data frames. Execution of the program of instructions further configures the apparatus to perform preamble-based estimation to estimate in-phase/quadrature imbalance using frequency domain symbols appearing in the preamble, perform blind estimation to estimate the phase/quadrature imbalance of one or more linearly dependent and independent subcarriers, generate an overall in-phase/quadrature imbalance estimate based on the preamble-based estimate and the blind estimation, and perform compensation based on the overall in-phase quadrature imbalance estimate.

DETAILED DESCRIPTION

One or more embodiments of the present invention address the mitigation or elimination of radio frequency (RF) impairments in WLAN receivers using direct-conversion architecture. A typical WLAN receiver consists of an RF front-end implemented in the analog domain and a baseband (BB) implemented in the digital domain. The analog domain implementations are more sensitive to the variations in fabrication process technology, supply voltage, and temperature. Such variations (called RF impairments) have detrimental effects on system performance. RF impairments can be mitigated or eliminated using signal processing in the digital baseband domain. Many current consumer-electronics radio transceivers, including those generally used in WLAN, use direct-conversion architecture (DCA). DCA suffers from an RF impairment called IQ imbalance. A typical direct down-conversion receiver converts an RF signal to a baseband signal in the analog domain. A baseband signal consists of two quadrature branches—the in-phase (I) and the quadrature (Q) signal.

Figure 1:
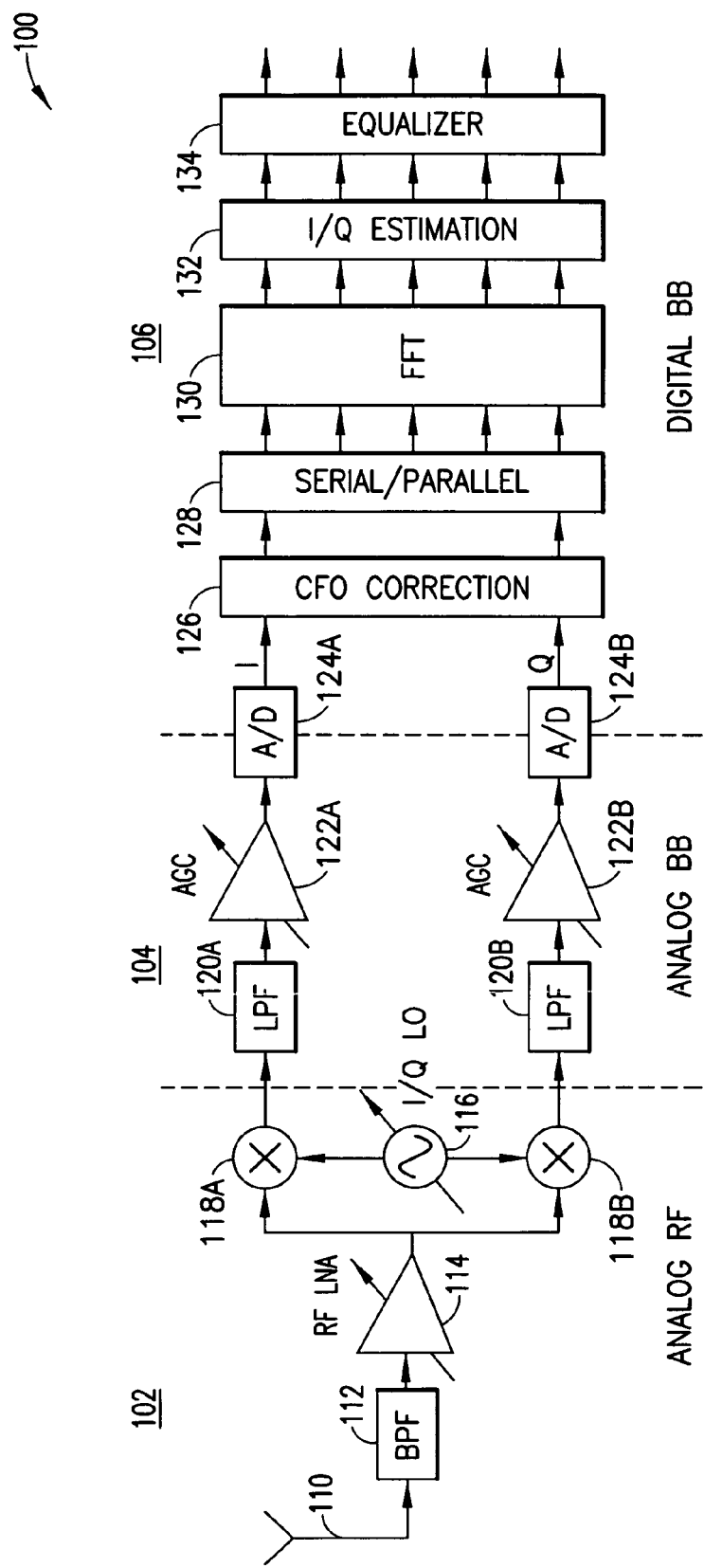
FIG. 1 illustrates a receiver according to an embodiment of the present invention.

FIG. 1 illustrates a direct conversion receiver 100 that may suitably employ one or more embodiments of the present invention. The receiver 100 comprises an analog radio frequency (RF) section 102, an analog baseband 104, and a digital baseband 106. The analog RF section 102 comprises an antenna 110, bandpass filter 112 and a low noise amplifier 114, as well as an in-phase/quadrature local oscillator 116. The low noise amplifier 114 and the local oscillator feed multiplexers 118A and 118B. The multiplexers 118A and 118B feed low pass filters 120A and 120B

(which serve as entry points to the analog baseband 104), respectively, and the filters 120A and 120B respectively feed automatic gain controls 122A and 122B. The automatic gain controls 122A and 122B feed analog to digital converters 124A and 124B (which serve as entry points to the digital baseband). These feed a carrier frequency offset 126, and in succession are a serial parallel converter 128, a fast Fourier transform 130, in-phase/quadrature (I/Q) estimation 132, and an equalizer 134. The (I/Q) estimation 132 suitably employs mechanisms according to one or more embodiments of the present invention, and these are described below in greater detail.

Using prior-art approaches, it is often difficult to match the characteristics of analog circuits used between the two quadrature branches. Any mismatch between the in-phase (I) and quadrature-phase (Q) branches manifests itself as an amplitude and/or phase imbalance. These IQ imbalances degrade the effective signal-to-interference-and-noise (SINR) ratio by introducing cross-talk (self-noise) between the image subcarriers of a typical multi-carrier communication system, such as orthogonal frequency division multiplexing (OFDM). Due to the nature of this impairment, it cannot be mitigated by increasing the transmit power. In addition, the impact of I/Q imbalance is more severe for a system operating at a high SINR region and employing high-order modulation and coding scheme, such as 256-QAM. Therefore, estimation and compensation of I/Q imbalances are crucial for the design and operation of high data-rate wideband systems employing direct-conversion receiver. Receivers using direct conversion architecture tend to be affected by I/Q imbalance.

Two types of I/Q imbalances exist. An I/Q imbalance that does not vary with the subcarrier frequencies, defined as frequency-independent I/Q imbalance, is generated primarily as a result of the loss of orthogonality and the gain mismatch in the cosine and the sine signals generated in a phase-splitter and used in a mixer (down-converter).

In addition, analog filters used in the I-branches and Q-branches of receivers may exhibit mismatched frequency responses. This mismatch introduces an I/Q imbalance that varies with the subcarrier frequencies, and is defined as frequency-dependent I/Q imbalance. These filters employ higher order design involving multiple poles and zeros, and thus exhibit sharp frequency response around the cut-off frequencies. The resulting frequency-selective IQ imbalance impacts the subcarrier frequencies around the cut-off frequencies more severely.

I/Q imbalance affecting a receiver using direct conversion architecture is not completely compensated in the following two cases: (1) the absence of a power-on calibration stage for the receiver; (2) the temperature drift of the analog components of I- and Q-branches, even if I/Q imbalances were compensated at the power-on stage. In both cases, the receiver does not know the parameters of its own I/Q imbalances since these I/Q imbalances can arise out of variations in fabrication process, supply voltage and ambient temperature, and might have changed since their last measurements.

In order to address these and other problems, one or more embodiments of the invention provide mechanisms for estimating the I/Q imbalances attributable to a receiver. Such mechanisms suitably take advantage of the known structure of preambles defined by wireless standards and used in a standards-compliant wireless system. These preambles may be used in such systems to estimate frequency-independent I/Q imbalances. At the same time, mechanisms according to one or more embodiments of the present invention use blind estimation to estimate the frequency-dependent I/Q imbalances. Estimation may be performed as in-service operation, without a need for additional reference signals or any nonlinear components, and may be performed on channels of any nature.

The estimation may be performed in frequency domain by jointly making use of any preambles with a specified type of structure, and making use of statistics of received symbols. In one example, the frequency-independent I/Q imbalance attributable to phase mismatch affecting a local oscillator (LO) may be estimated by exploiting a specified structure in existing preambles appearing in a standard-compliant implementation. Selected subcarriers are used to estimate the frequency-independent I/Q imbalance.

Subsequently, the frequency-dependent I/Q imbalances for all the subcarriers are estimated by using the second order statistics, such as variance and covariance, of a received signal.

Embodiments of the present invention operate under the assumption that data comes from a transmitter whose I/Q imbalance is completely compensated. This assumption is reasonable, since all standard-compliant transmitters are required to compensate their IQ imbalances to meet specific error-vector magnitude (EVM) requirements. The interference between image subcarrier pairs in the demodulated signal is assumed to be caused only by I/Q imbalance of the receiver.

One assumption on which embodiments of the invention may be based is that the data sequence on every subcarrier is zero-mean and wide sense stationary during the estimation process. This means that the variance of the data symbols on any subcarrier is constant during the estimation. This further requires that the transmission power and the modulation and coding scheme (MCS) of every subcarrier stays the same during the estimation. The data sequences on every image subcarrier pairs are also assumed to be independent.

Figure 2:
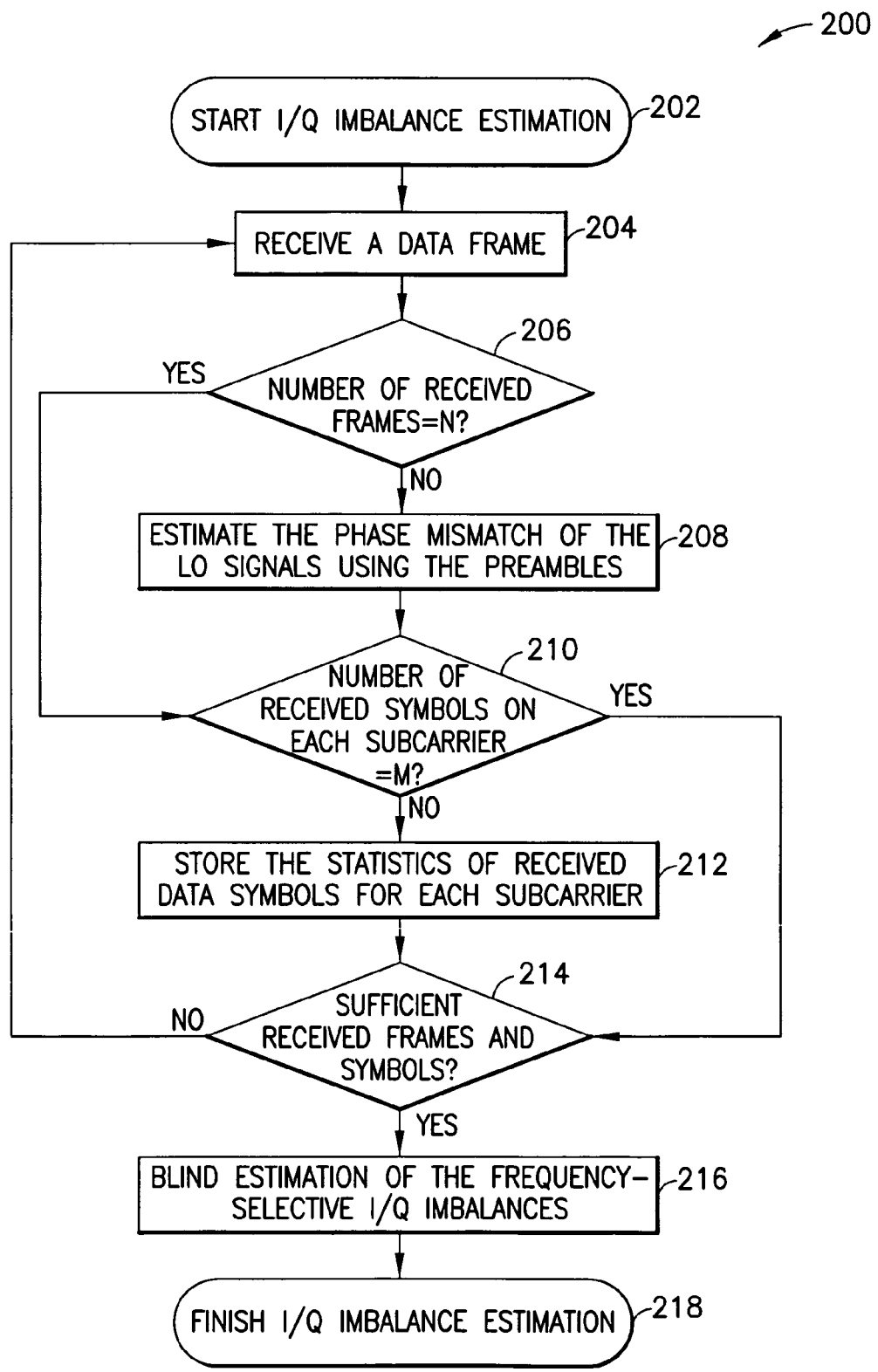
FIG. 2 illustrates a process of in-phase/quadrature imbalance estimation according to an embodiment of the present invention.

FIG. 2 illustrates a process 200 of I/Q imbalance estimation according to an embodiment of the present invention. At block 202, I/Q imbalance estimation begins. At block 204, a data frame is received and at block 206, the number of received frames is compared to a predetermined required number N. If the number of received frames does not equal N, the process proceeds to block 208 and the phase mismatch of the local oscillator signals is estimated using the preambles. The process then proceeds to block 210. If the number of received frames does equal N, the process skips to block 210.

At block 210, the number of received symbols on each subcarrier is compared to a predetermined required number M. If the number of received symbols does not equal M, the process proceeds to block 212 and statistics for received data symbols for each subcarrier are stored. The process then proceeds to block 214. If the number of received symbols does not equal M, the process skips to block 214.

At block 214, a determination is made as to whether sufficient frames and symbols have been received. If no, the process returns to block 204. If yes, the process proceeds to block 216, and blind estimation of the frequency-selective I/Q imbalances is performed. The process then terminates at block 218.

Details of the computations involved in I/Q imbalance estimation (such as the estimations performed at blocks 208 and 216, as described above) are presented below in greater detail. The variables used in this discussion are defined as follows:

| | |
|---|---|
| $S_1[k]$ | Modulated complex symbol of the first part of a preamble on subcarrier k |
| $S_2[k]$ | Modulated complex symbol of the second part of a preamble on subcarrier k |
| $X_1[k]$ | Received complex symbol of the first part of a preamble on subcarrier k |
| $X_2[k]$ | Received complex symbol of the second part of a preamble on subcarrier k |
| $\hat{\phi}_R[k]$ | Estimated phase mismatch of the sine and cosine wave based on the received preamble on subcarrier k |
| $\hat{\phi}_R$ | Average estimated phase mismatch of the sine and cosine wave |
| $\hat{\beta}[k]$ | Estimated ratio of the composite gain on Q branch over I branch on subcarrier k. The composite gain is the product of the amplitude of LO signal and the gain of the LPF on a specific branch. |
| $\hat{\theta}[k]$ | Estimated phase mismatch of the LPFs on I- and Q-branches on subcarrier k |
| $X_{(m)}[k]$ | The m-th received symbol for blind estimation on subcarrier k |
| $A[k]$ | The variance of $X[k] + X^*[-k]$ |
| $B[k]$ | The variance of $X[k] - X^*[-k]$ |
| $C[k]$ | The covariance of $X[k] + X^*[-k]$ and $X[k] - X^*[-k]$ |
| $\hat{A}[k]$ | Estimated variance of $X[k] + X^*[-k]$ from received symbols |
| $\hat{B}[k]$ | Estimated variance of $X[k] - X^*[-k]$ from received symbols |
| $\hat{C}[k]$ | Estimated covariance of $X[k] + X^*[-k]$ and $X[k] - X^*[-k]$ from received symbols |

As noted above, estimation comprises preamble-based estimation for frequency-independent parameters and blind estimation for frequency-dependent parameters. Preamble-based estimation takes advantage of the fact that a typical wireless system has a preamble at the beginning of a data frame. The preamble has a fixed structure and consists of two portions. A first portion, in which zeros appear on most of the subcarriers, is used for frame detection and coarse synchronization. The other portion, in which most of the subcarriers exhibit modulation, is used for fine synchronization and channel estimation. An example of the preamble used in the IEEE 802.11 WLAN standard is presented in the table below. The example presented in the table, presents the frequency domain symbols of L-STF and L-LTF for a 20 MHz channel, where L-STF is an example of the first portion and L-LTF is an example of the second portion. Every non-high throughput (non-HT) frame, high throughput (HT) frame, and very high throughput (VHT) frame has the legacy-short training field (L-STF) and the legacy-long training field (L-LTF). For larger channel bandwidth, e.g. 40 MHz, 80 MHz and 160 MHz, the structures of the preambles are similar, and are the repetition of the preambles of a 20 MHz channel in the frequency domain.

| | Subcarrier Index | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| L-STF | + | 0 | 0 | 0 | -1 - j | 0 | 0 | 0 | -1 - j | 0 | 0 | 0 | 1 + j | 0 | 0 | 0 |
| | - | 0 | 0 | 0 | 1 + j | 0 | 0 | 0 | -1 - j | 0 | 0 | 0 | -1 - j | 0 | 0 | 0 |
| L-LTF | + | 1 | -1 | -1 | 1 | 1 | -1 | 1 | -1 | 1 | -1 | -1 | -1 | -1 | -1 | 1 |
| | - | 1 | 1 | 1 | 1 | -1 | 1 | -1 | 1 | 1 | -1 | -1 | 1 | 1 | 1 | 1 |

| | Subcarrier Index | 16 | 17 | 18 | 19 | 20 | 21 | 22 | 23 | 24 | 25 | 26 |
|---|---|---|---|---|---|---|---|---|---|---|---|---|
| L-STF | + | 1 + j | 0 | 0 | 0 | 1 + j | 0 | 0 | 0 | 1 + j | 0 | 0 |
| | - | 1 + j | 0 | 0 | 0 | -1 - j | 0 | 0 | 0 | 1 + j | 0 | 0 |
| L-LTF | + | 1 | -1 | -1 | 1 | -1 | 1 | -1 | 1 | 1 | 1 | 1 |
| | - | 1 | 1 | -1 | 1 | -1 | 1 | 1 | -1 | -1 | 1 | 1 |

Consider an image subcarrier pair, say subcarriers k and −k. Let the frequency domain symbols of the first portion of the preamble on subcarrier k and −k be $s_1[k]$ and $s_1[-k]$, respectively, with corresponding received symbols as $X_1[k]$ and $x_1[-k]$. Also, denote by $s_2[k]$ and $S_2[-k]$ the frequency domain symbols of the second part of the preamble on subcarrier k and −k, with corresponding received symbols as $X_2[k]$ and $X_2[-k]$, respectively.

For subcarriers k and −k, if the complex vectors $(s_1[k], s_1[-k])$ and $(s_2[k], s_2[-k])$ are linearly independent, say $\lambda_1(s_1[k], s_1[-k]) + \lambda_2(s_2[k], s_2[-k]) = (0,0)$ if and only if $\lambda_1 = 0$ and $\lambda_2 = 0$, then the parameters of I/Q imbalance can be estimated on subcarrier k and −k.

Here, only the symbols on subcarriers ±4, ±8, ±20 and ±24 meet the requirement of linear independency. For example, the symbols of L-STF on subcarrier 24 and −24 are both 1 + j, while L-LTF have 1 and −1 on subcarrier 24 and −24, respectively, and (1+j, 1+j) are linearly independent with (1, −1), since $\lambda_1(1+j, 1+j) + \lambda_2(1, -1) = (0,0)$ holds if and only if $\lambda_1 = 0$ and $\lambda_2 = 0$.

The phase error of LO signals can be estimated on these subcarriers. For example, for subcarrier ±24, the phase error of LO signals according to subcarrier ±24 can be estimated as $$\hat{\phi}_R[k] = \frac{1}{2}\arg\left(\frac{X_1[k] + X_1^*[-k]}{S_1[k]} + \frac{X_2[k] + X_2^*[-k]}{S_2[k]}\right) -$$
$$\frac{1}{2}\arg\left(\frac{X_1[k] + X_1^*[-k]}{S_1[k]} - \frac{X_2[k] + X_2^*[-k]}{S_2[k]}\right) -$$
$$\frac{1}{2}\arg\left(\frac{X_1[k] - X_1^*[-k]}{S_1[k]} + \frac{X_2[k] - X_2^*[-k]}{S_2[k]}\right) +$$

-continued $$\frac{1}{2}\arg\left(\frac{X_1[k] - X_1^*[-k]}{S_1[k]} - \frac{X_2[k] + X_2^*[-k]}{S_2[k]}\right)$$

Similar estimation can be done for subcarriers ±4, ±8 and ±20. Other subcarriers do not meet the requirement of linear independency, so there is insufficient information to estimate I/Q imbalance parameters using preamble-based computations.

Using the approach above, an estimate of phase mismatch of LO signals, $\phi_R$, can be calculated for every subcarrier that meets the requirement of linear independency. The final estimate of the phase mismatch of LO signals is calculated by averaging over all the subcarriers that meet the requirement of linear independency.

$$\hat{\phi}_R = \text{mean}_k \hat{\phi}_R[k].$$

The estimated phase error of LO signals can be further averaged over multiple frames to increase the accuracy, provided the channel and I/Q imbalance parameters are invariant during the period for averaging. Since the estimation duration is much smaller compared with the time over which the channel and the IQ imbalances vary, averaging as described above provides an effective way to improve accuracy.

The receiver can collect the statistics of received symbols, and jointly use the statistics with the estimation of the phase mismatch of LO signals to obtain an estimation of other I/Q imbalance parameters. These parameters are: (1) $\beta[k]$, defined as the estimated ratio of the composite gain on Q branch over I branch on subcarrier k, where the composite gain is the product of the amplitude of LO signal and the gain of the LPF on a specific branch; (2) Phase mismatch of the LPFs, denoted by $\theta[k]$.

In addition, A, B and C are the second order statistics of the received symbols defined as follows:

$$A[k] \triangleq \text{var}(X[k]+X^*[-k])$$

$$B[k] \triangleq \text{var}(X[k]-X^*[-k])$$

$$C[k] \triangleq \text{cov}(X[k]+X^*[-k], X^*[-k], X[k]-X^*[-k])$$

The statistics A[k], B[k] and C[k] can be estimated by unbiased sample variance by sample averaging from M received samples per subcarrier, given by $$\hat{A}[k] = \frac{1}{M-1}\sum_{m=1}^{M}|X_{(m)}[k]+X_{(m)}^*[-k]|^2 - \frac{1}{M(M-1)}\left|\sum_{m=1}^{M}(X_{(m)}[k]+X_{(m)}^*[-k])\right|^2$$

$$\hat{B}[k] = \frac{1}{M-1}\sum_{m=1}^{M}|X_{(m)}[k]-X_{(m)}^*[-k]|^2 -$$

$$\frac{1}{M(M-1)}\left|\sum_{m=1}^{M}(X_{(m)}[k]-X_{(m)}^*[-k])\right|^2$$

$$\hat{C}[k] = \frac{1}{M-1}\sum_{m=1}^{M}(X_{(m)}[k]+X_{(m)}^*[-k])^* \cdot (X_{(m)}[k]-X_{(m)}^*[-k]) -$$

$$\frac{1}{M(M-1)}\left\{\sum_{m=1}^{M}(X_{(m)}[k]+X_{(m)}^*[-k])\right\}^* \sum_{m=1}^{M}(X_{(m)}[k]-X_{(m)}^*[-k])$$

where $X_{(m)}[k]$ is the m-th received symbol on subcarrier k. At a high SNR region, an estimation of the filter phase mismatch and the ratio of the composite gain is given by $$\hat{\theta}[k] = \begin{cases} \arg\hat{C}[k] + \arcsin\left[\frac{\sqrt{\hat{A}[k]\hat{B}[k]}\sin\hat{\phi}_R}{|\hat{C}[k]|}\right] \\ \arg\hat{C}[k] + \pi - \arcsin\left[\frac{\sqrt{\hat{A}[k]\hat{B}[k]}\sin\hat{\phi}_R}{|\hat{C}[k]|}\right] \end{cases}$$

$$\hat{B}[k] = \sqrt{\hat{B}[k]/\hat{A}[k]}$$

I/Q imbalance parameters $\hat{\beta}[k]$ and $\hat{\theta}[k]$ are estimated for per subcarrier.

Once the receiver I/Q imbalance parameter estimation has been accomplished, compensation techniques can be applied to the receiver in the frequency or the time domain.

Figure 3:
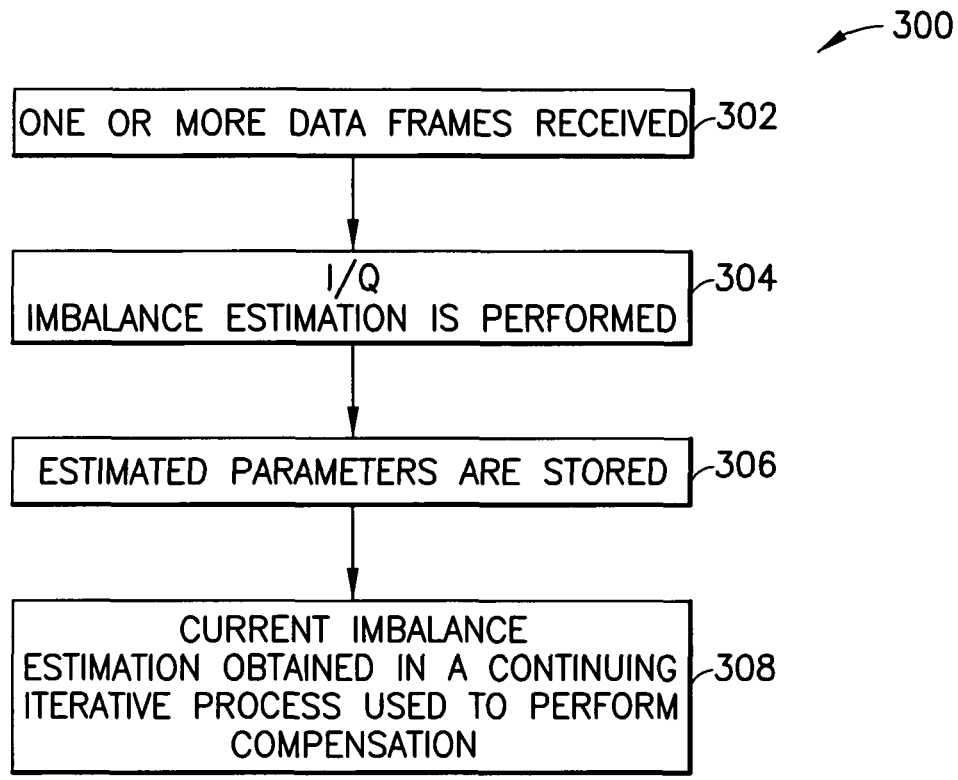
FIG. 3 illustrates a process of signal reception, imbalance estimation, and compensation, according to an embodiment of the present invention.

FIG. 3 illustrates a process 300 of receiver compensation, according to an embodiment of the present invention. At block 302, one or more data frames are received. At block 304, I/Q imbalance estimation is performed, with preamble-based estimation being performed for frequency-independent parameters and blind estimation being performed for frequency-dependent parameters. Receiving of data frames and I/Q imbalance estimation and storage of parameters may be performed iteratively, with data frames being collected and estimation being performed and refined as new frames are collected. At block 306, estimated parameters are stored. Receiving of data frames and I/Q imbalance estimation may be performed iteratively, with data frames being collected and estimation being performed and refined as new frames are collected. At block 308, a current estimate is used to perform receiver compensation.

Figure 4:
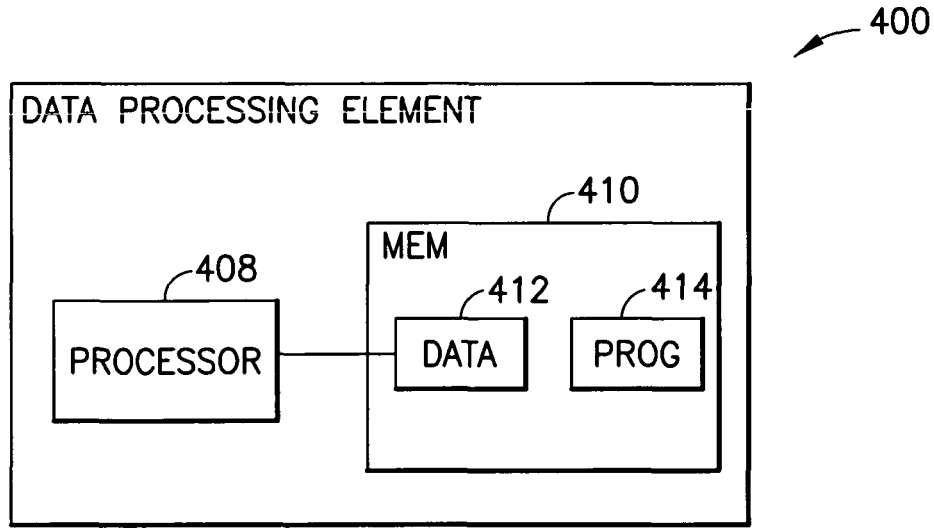
FIG. 4 illustrates computational elements according to an embodiment of the present invention.

FIG. 4 presents a data processing element 400 that may be used in a receiver such as the receiver 100 to perform I/Q imbalance estimation and compensation. The data processing element 400 may also include a processor 408 and memory 410. The data processing element 400 may employ data 412 and programs (PROGS) 414, residing in memory 410.

At least one of the PROGs 414 in the data processing element 400 is assumed to include a set of program instructions that, when executed by the associated processor 408, enable the data processing element to operate in accordance with embodiments of this invention. In these regards, embodiments of this invention may be implemented at least in part by computer software stored on the MEM 410, which is executable by the processor 408 of the data processing element 400, or by hardware, or by a combination of tangibly stored software and hardware (and tangibly stored firmware). Electronic devices implementing these aspects of the invention need not be the entire devices as depicted at FIG. 1 or FIG. 4 or may be one or more components of same such as the above described tangibly stored software, hardware, firmware and processor, or a system on a chip SOC or an application specific integrated circuit ASIC.

Various embodiments of the computer readable MEM 410 include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the processor 408 include but are not limited to general purpose computers, special purpose computers, microprocessors, digital signal processors (DSPs) and multi-core processors.

Various modifications and adaptations to the foregoing exemplary embodiments of this invention may become apparent to those skilled in the relevant arts in view of the foregoing description. While various exemplary embodiments have been described above it should be appreciated that the practice of the invention is not limited to the exemplary embodiments shown and discussed here.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

Various modifications and adaptations to the foregoing exemplary embodiments of this invention may become apparent to those skilled in the relevant arts in view of the foregoing description. While various exemplary embodiments have been described above it should be appreciated that the practice of the invention is not limited to the exemplary embodiments shown and discussed here.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

We claim:

1. An apparatus comprising:
at least one processor;
memory storing a program of instructions;
wherein the memory storing the program of instructions is configured to, with the at least one processor, cause the apparatus to at least:
receive one or more data frames transmitted to a direct conversion receiver operating in a wireless access network;
examine a preamble of each data frame to determine whether the subcarrier transmitting the data frame exhibits linear independence;
for each subcarrier exhibiting linear independence, perform preamble-based estimation to estimate in-phase/quadrature imbalance using frequency domain symbols appearing in the preamble;
perform blind estimation to estimate the phase/quadrature imbalance of subcarriers that have not been determined to exhibit linear independence;
generate an overall in-phase/quadrature imbalance estimate based on the preamble-based estimate and the blind estimation; and
perform compensation based on the overall in-phase quadrature imbalance estimate.

2. The apparatus of claim 1, wherein the preamble-based estimation is used to estimate phase error of local oscillator signals.

3. The apparatus of claim 1, wherein the overall in-phase/quadrature estimate is generated by averaging the phase error of local oscillator signals over multiple frames during periods in which channel and in-phase/quadrature imbalance parameters are invariant.

4. The apparatus of claim 1, wherein the apparatus is further caused to collect statistics for received symbols, and wherein blind estimation comprises jointly using the collected statistics with the estimation of the phase mismatch of local oscillator symbols to estimate additional in-phase/quadrature imbalance parameters.

5. The apparatus of claim 1, wherein the additional in-phase/quadrature imbalance parameters comprise at least one of: the estimated ratio of the composite gain on the quadrature branch over the in-phase branch on a specified subcarrier, wherein the composite gain is the product of the local oscillator signal and the gain of a low pass filter on a specified branch of a receiver; and phase mismatch of the low pass filters on different branches of the receiver.

6. The apparatus of claim 1, wherein the apparatus operates in a direct-conversion receiver operating under the IEEE 802.11 standard.

7. A method comprising:
receiving one or more data frames transmitted to a direct conversion receiver operating in a wireless access network;
examining a preamble of each data frame to determine whether the subcarrier transmitting the data frame exhibits linear independence;
for each subcarrier exhibiting linear independence, performing preamble-based estimation to estimate in-phase/quadrature imbalance using frequency domain symbols appearing in the preamble;
performing blind estimation to estimate the phase/quadrature imbalance of subcarriers that have not been determined to exhibit linear independence;
generating an overall in-phase/quadrature imbalance estimate based on the preamble-based estimate and the blind estimation; and
performing compensation based on the overall in-phase quadrature imbalance estimate.

8. The method of claim 7, wherein the preamble-based estimation is used to estimate phase error of local oscillator signals.

9. The method of claim 7, wherein the overall in-phase/quadrature estimate is generated by averaging the phase error of local oscillator signals over multiple frames during periods in which channel and in-phase/quadrature imbalance parameters are invariant.

10. The method of claim 7, further comprising collecting statistics for received symbols, and wherein blind estimation comprises jointly using the collected statistics with the estimation of the phase mismatch of local oscillator symbols to estimate additional in-phase/quadrature imbalance parameters.

11. The method of claim 7, wherein the additional in-phase/quadrature imbalance parameters comprise at least one of: the estimated ratio of the composite gain on the quadrature branch over the in-phase branch on a specified subcarrier, wherein the composite gain is the product of the local oscillator signal and the gain of a low pass filter on a specified branch of a receiver; and phase mismatch of the low pass filters on different branches of the receiver.

12. The method of claim 7, wherein the method is performed in a direct-conversion receiver operating under the IEEE 802.11 standard.

13. A non-transitory computer-readable medium storing a program of instructions execution of which by at least one processor configures an apparatus to at least:
receive one or more data frames transmitted to a direct conversion receiver operating in a wireless access network;
examine a preamble of each data frame to determine whether the subcarrier transmitting the data frame exhibits linear independence;
perform preamble-based estimation to estimate in-phase/quadrature imbalance using frequency domain symbols appearing in the preamble;
perform blind estimation to estimate the phase/quadrature imbalance of one or more linearly dependent and independent subcarriers;
generate an overall in-phase/quadrature imbalance estimate based on the preamble-based estimate and the blind estimation; and perform compensation based on the overall in-phase quadrature imbalance estimate.

14. The non-transitory computer-readable medium of claim 13, wherein the preamble-based estimation is used to estimate phase error of local oscillator signals.

15. The non-transitory computer-readable medium of claim 13, wherein the overall in-phase/quadrature estimate is generated by averaging the phase error of local oscillator signals over multiple frames during periods in which channel and in-phase/quadrature imbalance parameters are invariant.

16. The non-transitory computer-readable medium of claim 13, wherein the apparatus is further configured to collect statistics for received symbols, and wherein blind estimation comprises jointly using the collected statistics with the estimation of the phase mismatch of local oscillator symbols to estimate additional in-phase/quadrature imbalance parameters.

17. The non-transitory computer-readable medium of claim 13, wherein the additional in-phase/quadrature imbalance parameters comprise at least one of: the estimated ratio of the composite gain on the quadrature branch over the in-phase branch on a specified subcarrier, wherein the composite gain is the product of the local oscillator signal and the gain of a low pass filter on a specified branch of a receiver; and phase mismatch of the low pass filters on different branches of the receiver.

18. The non-transitory computer-readable medium of claim 13, wherein the apparatus operates in a direct-conversion receiver operating under the IEEE 802.11 standard.

* * * * *